L. H. NASH.
ROD CONNECTION.
APPLICATION FILED MAR. 6, 1911.
1,081,768.
Patented Dec. 16, 1913.
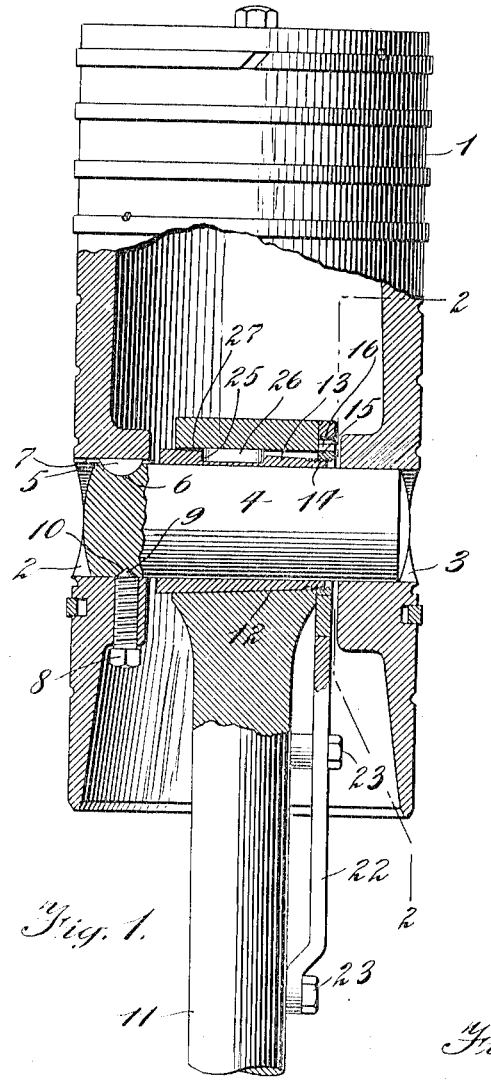
Fig. 1.
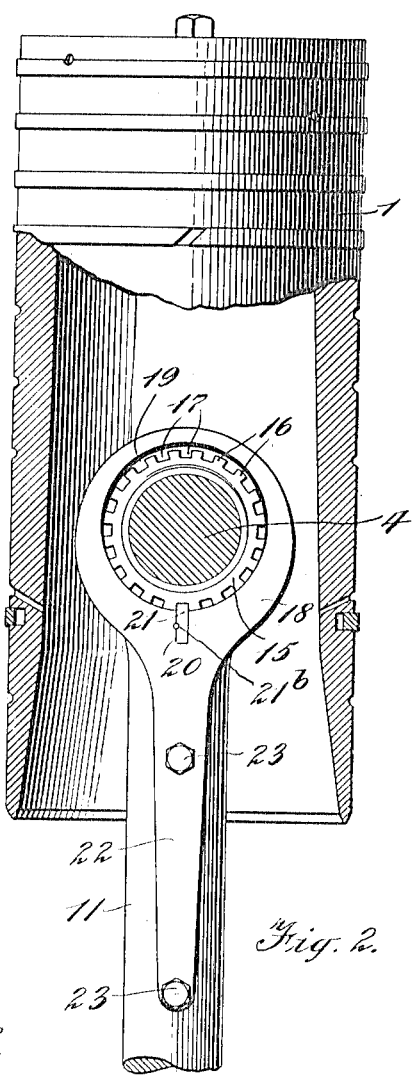
Fig. 2.
Fig. 3.
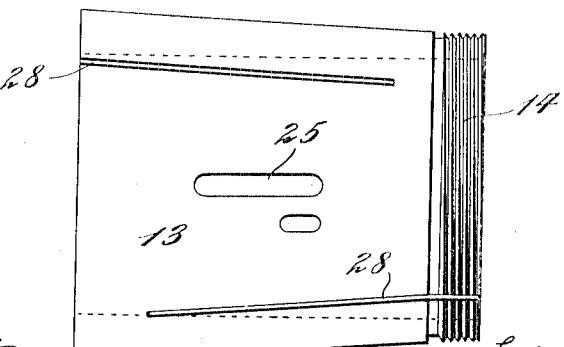
Witnesses:
Inventor
Lewis Hallock Nash
By his Attorneys
Gifford & Bull

UNITED STATES PATENT OFFICE.

LEWIS HALLOCK NASH, OF SOUTH NORWALK, CONNECTICUT.

ROD CONNECTION.

1,081,768. Specification of Letters Patent. Patented Dec. 16, 1913.

Application filed March 6, 1911. Serial No. 612,482.

*To all whom it may concern:*

Be it known that I, LEWIS HALLOCK NASH, a citizen of the United States, residing at South Norwalk, in the county of Fairfield and State of Connecticut, have invented certain new and useful Improvements in Rod Connections, of which the following is a specification.

My invention relates to new and useful improvements in rod connections and more particularly to means for connecting a piston rod to a piston, the object being to provide effective and simple means for regulating the contact of the bearing surface between a piston rod and the cross pin of a piston so that the proper bearing contact will be maintained, and to provide means whereby any looseness in the joint between the rod and cross pin may be taken up, should the same result from wear or other causes.

The invention consists in the construction and combination of parts to be fully described hereinafter, and the novelty of which will be particularly pointed out and distinctly claimed.

I have fully and clearly illustrated the invention in the accompanying drawings to be taken as a part of the specification and wherein, Figure 1 is a longitudinal section through a piston head and the connection embodying my invention. Fig. 2 is a section on the line 2—2 of Fig. 1 looking toward the left. Fig. 3 is a detail elevation of a taper bushing forming one of the elements of the illustrated embodiment of my invention.

While I have shown and described my invention as being particularly applicable for use as a connection between a piston and piston rod, I wish it understood that I do not limit myself to such particular construction, as the invention is capable of wide application and use in any situation wherein a rod is connected to another element by a pin or similar element.

Referring to the drawings by characters of reference, 1 designates a hollow piston head of the type such as is usually employed in the power cylinder of an internal combustion engine. The skirt or flange of this piston head is formed with diametrically opposed circular openings 2, 3 to receive a cylindrical cross pin 4 which bridges the space within the piston, as clearly shown in Fig. 1 of the drawings. This cross pin 4 may be held against rotation in the openings 2, 3 by a key 5 having a curved inner face which is seated in a curved recess 6 in the pin 4 and extending longitudinally thereof. This key projects beyond the outer cylindrical surface of the pin 4 and has a straight outer edge to engage within a slot 7 in the inner wall of the opening 2, said slot extending in a general direction longitudinally of the pin 4 and transversely of the piston. The pin 4 may be held against longitudinal movement by a holding bolt 8 threaded through a part of the piston head and having a pointed end 9 to enter a recess 10 in the cross pin.

11 designates a piston rod having an end located within the hollow piston and formed at said end with a transverse tapering bore 12 which tapers in one direction only, as shown in Fig. 1 of the drawings, from left to right, said bore being arranged to receive the cross pin whereby the piston and rod 11 are connected.

Means is provided, preferably located between the surface of the cylindrical pin 4 and the inner surface of the opening through the piston rod for regulating the position of said elements relative to each other, and which is adjustable to compensate for or take up any looseness between the parts which may result from wear, or other causes. This means preferably consists of a compensating bushing or take-up sleeve 13 surrounding the pin 4 between the same and the inner wall of the bore 12, the inner bore of said bushing or sleeve being cylindrical so as to closely fit the cross pin while the outer surface is tapered from left to right to correspond with the internal tapered bore of the rod 11, said tapering surfaces engaging each other, as clearly shown in Fig. 1 of the drawings.

Means is provided for moving the bushing relative to the rod so as to take up the wear between the parts or to regulate contact between the same. This means may take a variety of forms, but I prefer to employ that which will now be described: The smaller end portion of the bushing 13 is exteriorly threaded as at 14, said threaded portion projecting beyond the side face of the piston rod, and threaded onto this portion 14 is a circular nut 15 provided with an annular series of projections 16 separated equidistant by recesses or spaces 17. Carried by the connection is an operating element in the form of a wrench which is adapted to coöperate with the bushing 13 so as to draw the same along the pin 4 to cause the tapered surface of said bushing to coöperate with the tapered surface of the bore 12 to take up the wear between the parts. This operating element is preferably in the form of a wrench consisting of an annular element 18 surrounding the pin 4 and having an aperture 19, said aperture being of a diameter greater than the extreme diameter of the nut 15; that is, of a diameter greater than the diameter of the nut including the projections 16. The element 18 is formed with a recess 20 in which is seated and held in any suitable manner a projection 21 which extends within the aperture 19 and is adapted to coöperate with the projections on the nut 15 to rotate the latter and also to hold the same against rotation in a manner to be presently described.

As shown in Figs. 1 and 2, the operating member 18 is in position to hold the nut against rotation, said operating member being provided with a handle or tail piece 22 which is adapted to be fixed to the rod by bolts 23 passed through said handle and adapted to enter threaded recesses in the rod. With the parts in this position the tapered sleeve will be held in any position to which it may have been adjusted.

When it is desired to adjust the bearing or connection, the bolts 23 are removed so as to disconnect the handle of the operating element from the rod and the latter can then be swung in either direction to turn the nut 15 to move the sleeve 13. By making the aperture in the operating element of greater diameter than the extreme diameter of the nut, I am able to turn the nut to the desired degree and then move the operating element down so as to disengage the projection 21 from the nut and return said element to the position shown in Fig. 2 to be again engaged with a recess in the nut and be locked in this position to hold the nut against rotation. By the arrangement just described I am also able to obtain substantially the equivalent of a ratchet movement in that the operating element can be swung to turn the nut and then be disengaged therefrom and returned to again engage the nut to give the same a further turning movement.

The projection 21 is preferably in the form of a pin or block removably seated within a recess 20 in the member 18 and held in said recess by a key 21ᵇ, this arrangement being preferred for convenience of manufacture and in order that a new pin may be inserted when necessary.

I preferably split the bushing 13 by oppositely directed kerfs 28 extending from the opposite ends of said bushing inwardly and terminating at their inner ends short of the opposite end of the bushing, by which arrangement the bushing is permitted to collapse so that it can be drawn into place in tightening the connection.

In order to prevent turning of the sleeve 13 about the pin 4 I provide the same with a longitudinal recess 25 in which is seated a removable key 26 which is adapted to coöperate with a groove 27 in the upper wall of the bore 12, said key being adapted to slide longitudinally of said groove when the tapering sleeve is adjusted. By the above arrangement and construction it will be seen that I provide efficient means for adjusting the parts of the bearing, and which means specifically includes an operating element forming a part of the structure which performs two functions; namely, (1) to adjust the parts, and (2) to act as a holding means for the parts after having been adjusted.

While I describe the element 4 as being a pin, I do not use that term by way of limitation either in the specification or claims, as I deem a shaft or any other element which would coöperate with the rod in the manner described as being the equivalent thereof.

What I claim and desire to secure by Letters Patent of the United States is:—

1. In combination, a pin, a member surrounding the pin and having a tapered inner surface, a bushing between the pin and member and having a tapered surface to correspond with the tapered surface of said member and having a thread, a nut engaging the thread, said nut having a plurality of spaced projections, an annular operating member surrounding the pin and having a projection to coöperate with the projections on the nut, the internal diameter of said operating member being greater than the extreme diameter of the nut.

2. In combination, a hollow flanged member, a transverse pin seated in the flange of said member, a pitman rod having a tapered opening receiving said pin, a tapered bushing between said rod and pin, a nut threaded on the end of the bushing, a wrench member surrounding the pin and adapted to engage the nut, said wrench having a handle member adapted to extend longitudinally of the pitman rod, and means for rigidly connecting the handle member to said rod.

3. In combination, a hollow flanged member, a transverse pin seated in the flange of said member, a pitman rod having a tapered opening receiving said pin, a tapered bushing between said rod and pin, a nut threaded on the end of the bushing and having a plurality of spaced projections, a wrench member consisting of an annular part surrounding the nut, the internal diameter of said part being greater than the extreme diameter of the nut, an inwardly-directed projection on said part adapted to coöperate with the projections on the nut, a handle rigid with said part and extending longitudinally of said rod, and means for rigidly and detachably connecting said handle to said rod.

4. In combination, a pin, a member surrounding the pin, compensating means between the pin and member, a nut engageable with said compensating means and having a projection, an annular operating member surrounding the pin and having an internal diameter greater than the diameter of said nut, whereby said member is movable laterally relative to the nut, and a projection on said operating member adapted to coöperate with the projection on the nut, said projection being engaged and disengaged by the said lateral movement of the operating member.

In testimony whereof I have hereunto signed my name in the presence of two subscribing witnesses.

LEWIS HALLOCK NASH.

Witnesses:
M. E. McNINCH,
C. G. REYLMUN.